United States Patent [19]

Bookbinder et al.

[11] Patent Number: 5,507,990
[45] Date of Patent: Apr. 16, 1996

[54] METHOD FOR FORMING GLASS/POLYMER PELLETS

[75] Inventors: Andrea W. Bookbinder; Michael Fischer, both of Corning; Roy J. Monahan, Painted Post, all of N.Y.

[73] Assignee: Corning Incorporated, Corning, N.Y.

[21] Appl. No.: 176,226

[22] Filed: Mar. 14, 1994

[51] Int. Cl.$^6$ ........................................................ B29B 9/06
[52] U.S. Cl. ................................ 264/143; 65/66; 65/133; 264/211
[58] Field of Search ....................................... 264/143, 211, 264/211.11; 65/66, 112, 133, 144, 442

[56] References Cited

U.S. PATENT DOCUMENTS

| | | | |
|---|---|---|---|
| 2,335,515 | 11/1943 | Jehle | 425/315 |
| 2,975,483 | 3/1961 | Copper et al. | 264/143 |
| 3,732,181 | 5/1973 | Ray et al. | 523/207 |
| 4,467,969 | 8/1984 | Godfrey et al. | 425/219 |
| 4,737,407 | 4/1988 | Wycech | 264/143 |
| 5,015,723 | 5/1991 | Sugimoto et al. | 528/190 |
| 5,043,369 | 8/1991 | Bahn et al. | 65/66 |
| 5,265,507 | 11/1993 | Noda et al. | 264/143 |
| 5,267,845 | 12/1993 | Anderlind et al. | 264/143 |
| 5,313,864 | 5/1994 | Forgash et al. | 83/349 |

FOREIGN PATENT DOCUMENTS

| 1060186 | 3/1967 | United Kingdom | 264/143 |
|---|---|---|---|

*Primary Examiner*—Robert Davis
*Attorney, Agent, or Firm*—Angela Nwaneri; Timothy M. Schaeberle

[57] ABSTRACT

The instant invention discloses a method for forming glass/polymer alloy or composite pellets of a uniform shape, and exhibiting an increased density and pellet integrity/strength. The pellets are formed by melt-blending and extruding a semi-molten strand of the glass/polymer alloy or composite and subsequently compressing and cutting the strand into pellets at a predetermined pelletizing temperature. The predetermined pelletizing temperature is that temperature at which the glass/polymer alloy or composite extruded strand is still semi-molten and deformable and at which the so-formed pellets will maintain the shape imparted to them.

9 Claims, No Drawings

METHOD FOR FORMING GLASS/POLYMER PELLETS

FIELD OF THE INVENTION

This invention relates to a novel method of forming raw material pellets comprised of glass/polymer alloy or composite material and more particularly the invention relates to a method wherein the pellet is formed while the glass/polymer alloy or composite material is semi-molten and deformable resulting in pellets which exhibit a uniform shape, an increased density and pellet integrity.

BACKGROUND OF THE INVENTION

A new family of glass/polymer alloy materials was discovered and described in U.S. Pat. No. 5,043,369 (Bahn et al.). As explained therein, alloy articles consist essentially of an inorganic oxide glass, preferably a phosphate-based glass, and an organic thermoplastic or thermosetting polymer having a working temperature compatible with that of the glass. The low temperature phosphate glass is "melt mixed" with the polymer at the working temperature to form an intimate mixture; i.e., the glass and the polymer are both in a sufficiently fluid state to be blended together to yield a body exhibiting an essentially uniform, fine-grained microstructure.

Once melt-mixed the materials are then extruded through dies and the so-formed raw material strand is then cut into pellets of the desired size. Thereafter, the raw material glass/polymer pellets are then used in injection molding processes to form the desired final product. Conventional wisdom in the plastic processing technology taught the cutting of the extruded strand in its cooled form; based in part on the fact that the molten strand typically stuck to the metal of the cutting tool utilized, whether it be a roller or a cutting wheel. This practice of cutting the so-formed strand in its cooled form was standard in the polymer industry and, therefore it was utilized in the formation of glass/polymer alloy pellets; however, the pellets which resulted were of poor quality. As a result of the lowered ductility of the cooled phosphate glass/polymer strand, when compared to standard cooled plastic strand, the pellets were formed as result of a fracture mechanism of the strand. Thus, the so-formed glass/polymer pellets exhibited irregular shapes and poor flow in addition to being dusty as a result of the high percentage of fines produced. Due to the fact that these fines were subsequently sieved and discarded, the process of cutting the so-formed glass/polymer strand in its cooled state exhibited a very poor yield, on the order of approximately 65–85%. Finally, this method resulted in pellets which exhibited a poor strength and thus additional fines were produced in handling the material. These fines so-produced caused a contamination problem for injection molders as they built up static charges during conveyance by sticking in hoppers and vacuum transfer lines.

As a result of this poor pellet quality and subsequent contamination problem, a better method for producing glass/polymer alloy pellets was therefore sought.

SUMMARY OF THE INVENTION

Hence, the instant invention is directed at method for forming glass/polymer alloy or composite pellets of a uniform shape, and exhibiting an increased density and pellet integrity/strength. The method comprises melt-blending and extruding a semi-molten strand of the glass/polymer alloy or composite and subsequently compressing and cutting the strand into pellets at a predetermined pelletizing temperature. The predetermined pelletizing temperature is that temperature at which the glass/polymer alloy or composite extruded strand is still semi-molten and deformable and at which the so-formed pellets will maintain the shape imparted to them.

In addition to the increase in density, uniformity and pellet integrity the resultant pellets exhibit better injection molding behavior as a result of the elimination of, and the prevention of the additional formation of, fines.

DETAILED DESCRIPTION OF THE INVENTION

TABLE I records a preferred glass composition, expressed in terms of mole percent on the oxide basis, used in preparing a glass/polymer alloy for demonstrating the inventive process disclosed herein. The glass was compounded from the appropriate oxide, carbonate and phosphate batch materials, whichever was appropriate and most convenient. Those batch materials were automatically tumble-mixed and melted in a continuous glass melter. The glass was melted and maintained at a temperature of approximately of 1000° C. for a period of approximately 1 hour. Because a pulverized material was desired to form feedstock for extrusion, the melt was then poured as a fine stream into a bath of cold water, a practice termed "drigaging". Following drigaging, the glass particles formed were then sieved to obtain glass particles ranging from about 0.177 mm to 0.841 mm. The glass particles so-formed were then subsequently annealed overnight at temperature of approximately of about 250°–275° C.

TABLE I

| | |
|---|---|
| $P_2O_5$ | 33 |
| ZnO | 40 |
| $Al_2O_3$ | 2 |
| $Li_2O$ | 7 |
| $Na_2O$ | 8 |
| $K_2O$ | 5 |
| SnO | 5 |

The polymer material which was co-extruded with the above-described glass composition to demonstrate the inventive method of forming the pellets was comprised of the following polymer tri-blend mixture (equal parts by weight of each component):

1. Liquid crystal polymer powder (ave. particle size between about 1–10 μm) marketed by Amoco Performance Products Inc. under the designation Xydar 900— designated herein as LCP1;

2. Liquid crystal polymer powder (ave. particle size between about 1–10 μm) marketed by Amoco Performance Products Inc. under the designation Xydar 700— designated herein as LCP2; and, 3. Polyetheretherketone (approximately 0.125" (3.18 mm) chips) marketed by Imperial Chemical Industries Ltd. under the designation PEEK 450—designated herein as PEEK.

Although the instant specification describes the inventive process in utilizing the above polymer mixture, it is contemplated that the method described herein would work equally well when extruding any glass/polymer alloy containing a phosphate glass and a co-deformable polymer. Polymers specifically contemplated as within the scope of the invention are such thermoplastics as polyaryletherketones, polyolefins, ABS, polystyrenes, polyphenylene sulfides, polyfluoro resins, polyetherimides, liquid crystal polyesters, polyethersulfones, polyetheretherketones, polyetherketones, polyethylterephthalates, polybutylterephthalates, melamines, polyamides, polycarbonates, and mixtures thereof. Thermosets such as epoxy resins, silicone resins, polyimides, phenolics, diallyl phthalates and mixtures thereof should also be included within the scope of the invention.

Generally speaking, alloy processing involves first thoroughly drying the finely-divided fragments/pellets of glass, and pellets, chips or powders of organic polymer. Once dried, the polymer and the glass, in whatever forms, are fed into a twin screw extruder programmed to operate at temperatures at which the glasses exhibit a viscosity within the range of about $10^4$–$10^7$ poises ($10^3$–$10^6$ Pa.s), i.e., a temperature and viscosity represented by the working temperature of the glass. High shear forces of at least about 1000 sec.$^{-1}$ should be generated in the extruder to assure very fine melt mixing at those viscosities. The so-mixed material is then extruded in a rod-like form into the ambient environment. Once the extrudate exits the extruder, it is then pelletized by compressing and pelletizing or cutting the semi-molten strand into pellets at a predetermined pelletizing temperature.

The following description outlines specific extrusion, stabilization and injection molding parameters employed in the examples reported below:

In each example the glass particles having an average particle size of about 0.177 mm. to 0.841 mm. were dried overnight in a forced air oven operating at about 150° C. Thereafter, the glass was combined with the tri-blend polymer mixture (i.e., ⅓ a LCP1, ⅓ LCP2, ⅓ a PEEK) to form a mixture comprised of 78% glass/22% polymer tri-blend mixture (% by weight). This mixture was fed into a 34 mm twin screw co-rotating, intermeshing bilobal extruder, marketed by the American Leistritz Extruder Corporation, Somerville, N.J., in order to achieve the desired fine mixing of glass and polymer. As earlier disclosed, the extruder exhibited high shear forces of approximately 1000 sec.$^{-1}$ and had the capability of providing a temperature profile along the length of the barrel thereof. Illustrative are the typical extrusion conditions utilized for the glass/polymer alloy compounding: temperatures between about 300°–360° C. in the first zone; about 320°–430° C. in the second zone; about 320°–430° C. in the third zone; and, a die temperature between about 320°–430° C. A rotor speed of about 200–270 RPM was utilized.

The so-mixed glass/polymer material was then extruded, in a strand-like form of approximately 0.095" (2.41 mm) in diameter, into the ambient environment. This extrudate was then fed to a pelletizer manufactured by Conair Inc.-Jetro Division, Bay City, Mich. under Model No. 304, which possessed a nip roll and a corresponding cutting roll. It is imperative to note that pelletizer was positioned approximately 1–3 ft (0.305–0.915 m) from the extruder die; a position such that the semi-molten extrudate possessed the predetermined pelletizing temperature of about between 290°–340° C. when it contacted both the nip roll and the cutting roll. After entering the pelletizer, the nip roll subsequently compressed the semi-molten and deformable extrudate and fed the so-formed compressed extrudate to the cutting roll. The compressed extrudate, still possessing the predetermined pelletizing temperature of between about 290°–340° C., was subsequently cut by the cutting roll, located approximately 2" (50.8 mm) and collected. The resulting pellets were chip-like in shape, and exhibited uniform size and shape. These so-formed rectangular pellets possessed an average dimension of approximately 4.0×3.0×1.0 mm.

The predetermined pelletizing temperature, as described above, is that temperature wherein the extrudate is still in its semi-molten form and still deformable, such that it is able to be deformed and cut into a pellet and still retain the shape imparted to it. It is contemplated that this temperature varies for different glass/polymer alloy compositions and thus it will be determined on an empirical basis for each composition produced. If the pelletizing temperature chosen is too low, the extrudate will be shattered or crushed by the pelletizer blade, resulting in poor quality, non-uniform pellets and a large number of undesirable fines. On the other hand, if the pelletizing temperature chosen is too high, the extrudate will likely flow onto the blade and collect thereon. Furthermore, any extrudate cut and not collected on the blade will most likely not maintain the shape imparted to it. Once the proper pelletizing temperature is determined, the deforming means and cutting or pelletizing means shall be positioned such that the extrudate exhibits the proper temperature when deformed and cut.

It has been determined that the preferred temperature range for the above glass/polymer blend possessing a phosphate glass-liquid crystal polymer-polyetheretherketone mixture is between about 290°–340° C. It is likely that the temperature range would be similar for glass/polymer alloys comprised of any of the high temperature polymer listed hereinabove. However, polymers possessing a lower or higher processing temperatures than the two polymers utilized herein would likely exhibit a slightly lower or higher range respectively.

It is contemplated that the dimensions of the chip-like pellets could be easily modified by changing the diameter of the die of the extruder and/or by increasing the interval between the cuts of the pelletizer blade.

Utilizing the above pelletizing method, 28.61 lbs. (13 kg) of product comprised of the above described composition was generated. Approximately 27.9 lbs. (12.68 kg) of the product produced resulted in acceptable pellets ("new" pellets), thus a yield of 97.5%, i.e., 0.7816 (0.36 kg) lbs. of fines. In comparison, 30.01 (13.6 kg) lbs. of product of the same composition was produced using the old method of forming the pellets, i.e., the cutting of the strand at the improper pelletizing temperature—a cooled and un-molten form. The resultant yield of 83.3% (i.e., 5.0 lbs. (2.27 kg) of fines) of usable pellets, i.e., "old" pellets was considerably lower using this standard method.

The strength exhibited by the glass/polymer pellets formed by the inventive method, "new" pellets, was compared to that exhibited by pellets formed using the standard method of pelletizing, "old pellets. The strength data which appears in TABLE II was generated in the following manner: Samples of both "old" and "new" pellets weighing 350 g each were placed in 500 ml Nalgene bottles and placed on a roller mill for various intervals of time ranging from ½ to 3¼ hours (Time(hrs.)); this test is a simulation of the typical conditions pellets would be exposed to in any shipping of material. It is obvious that stronger pellets exhibiting an increased pellet integrity would crush and fracture less easily and therefore generate less fines than weaker pellets. Following each time interval the sample was removed, sieved to remove the fines (particles passing through a 1.68 mm opening) created as a result of the milling, and reweighed. The decrease in the weight of the sample represented a calculation of the loss due to fines.

TABLE II reports the data generated from the "strength" test; the "new" pellet samples, 1A–7A, reported a lower loss due to fines (a higher strength) than the "old" pellet samples, 1B–7B, for equivalent time periods. For example, Example 6A exhibited a 3.25 g loss due to fines while Example 6B reported a 8.5 g loss due fines as a result of the same 3¼ hour milling period. In other words, the strength or pellet integrity of the "new" pellets was increased when compared to that of the "old" pellets.

TABLE II

| Sample No. | Time (hr.) | Fines (g) | Sample No. | Time (hr.) | Fines (g) |
|---|---|---|---|---|---|
| 1A | 0.5 | 3.0 | 1B | 0.5 | 4.2 |
| 2A | 0.5 | 3.5 | 2B | 0.5 | 6.7 |
| 3A | 1.0 | 2.9 | 3B | 1.0 | 7.6 |
| 4A | 1.0 | 3.0 | 4B | 1.0 | 5.5 |
| 5A | 3.25 | 3.37 | 5B | 3.25 | 6.6 |
| 6A | 3.25 | 3.3 | 6B | 3.25 | 8.5 |
| 7A | 16.5 | ~3.5 | 7B | 16.5 | ~9.5 |

Random samplings of the both "new" and "old" pellets were taken for measurement of the respective pellets bulk density. The bulk density exhibited by the "new" pellets (A samples) and that exhibited by "old" pellets ("old pellets) is reported in TABLE III. It is obvious from the data reported therein that the "A" pellet samples exhibit a greater density than that exhibited by the "B"; the "A" samples possessed an average bulk density of 0.892 g/co while the "B" pellet samples possessed an average of 0.8314 g/cc.

TABLE III

| Sample No. | Bulk Density (g/cc) | Sample No. | Bulk Density (g/cc) |
|---|---|---|---|
| 8A | 0.904 | 8B | 0.797 |
| 9A | 0.893 | 9B | 0.846 |
| 10A | 0.881 | 10B | 0.836 |
| 11A | 0.906 | 11B | 0.831 |
| 12A | 0.877 | 12B | 0.847 |

In addition to the increase in pellet integrity/strength, the increase pellets' bulk density and the increase in yield of usable extrudate, the resulting pellets have an additional advantage in that the pellets have been observed to exhibit better injection molding behavior. Specifically, the pellets feed better into injection molders, i.e., the pellets flow better and pack better without material bridging or hangup. In addition, as a result of an increased pellet bulk density, i.e., a decreased pellet porosity, there is less air/gas generated once the pellets remelt in the injection molding process, thus requiring lessened removal of gas/air from the molder during the actual molding. These advantages as a result of the improved pellet forming process lead, in turn, to an increase in efficiency of the subsequent injection molding process.

Depending upon the glass composition and the polymer involved, typical injection molder conditions for a typical injection molder, such as the 55 ton reciprocating screw injection molding machine marketed by Battenfeld of America, W. Warwick, R.I., under which the improved molding performance of the pellets have been observed are the following: operation at temperatures ranging about 300°–430° C. and at pressures in excess of 15,000 psi.

While this invention has been exemplified with respect to specific processing techniques and conditions, specific ingredients and amounts thereof, and utilities, all variations thereof obvious to one skilled in the art are intended to be included within the spirit and purview of this application and the scope of the appended claims.

Specifically, the instant invention as described above is applies equally well to glass/polymer composites as well the as glass/polymer alloys mentioned throughout the description. A glass/polymer as defined in U.S. Pat. No. 5,043,069 (Bahn et al.) is a material which consists essentially of an inorganic oxide glass, preferably a phosphate-based glass, and an organic thermoplastic or thermosetting polymer having a working temperature compatible with that of the glass. The low temperature phosphate glass is "melt mixed" with the polymer at the working temperature to form an intimate mixture; i.e., the glass and the polymer are both in a sufficiently fluid state to be blended together to yield a body exhibiting an essentially uniform, fine-grained microstructure. On the other hand, a glass/polymer composite, as used herein is defined as something made up of distinct parts, i.e., an organic polymer, with a glass filler, with no interaction between the distinct glass and polymer parts. More specifically, glass/polymer composites, may be defined as multi-phase materials of two or more components; the polymer comprises the continuous phase which contains fillers or reinforcing agents, the function of the two frequently overlapping.

We claim:

1. A method for forming pellets of an alloy or composite of glass and polymer of increased density, uniformity and strength, the method comprising providing a semi-molten strand of a glass and polymer mixture, and deforming and cutting the semi-molten strand into chip-shaped pellets at a predetermined pelletizing temperature, wherein the pelletizing temperature is that temperature at which the strand is still semi-molten and deformable and at which the so-formed pellets will maintain the shape imparted to them.

2. The method as claimed in claim 1 wherein the semi-molten strand is comprised of a high temperature thermoplastic selected from the group consisting of polyaryletherketones, polyolefins, ABS, polystyrenes, polyphenylene sulfides, polyfluoro resins, polyetherimides, liquid crystal polyesters, polyethersulfones, polyetheretherketones, polyetherketones, polyethylterephthalates, polybutylterephthalates, melamines, polyamides, polycarbonates, and mixtures thereof or of a high temperature thermoset selected from the group consisting of epoxy resins, silicone resins, polyimides, phenolics, diallyl phthalates and mixtures thereof and wherein the pelletizing temperature is at least above about 275° C.

3. The method as claimed in claim 1 wherein the semi-molten strand is comprised a liquid crystal or a polyetheretherketone polymer or mixtures thereof and wherein the pelletizing temperature is approximately between 290°–340° C.

4. The method as claimed in claim 1 wherein the pelletizing temperature is that temperature at which the semi-molten strand exhibits a viscosity within the range of about $10^4$–$10^7$ poises ($10^3$–$10^6$ Pa.s).

5. The method as claimed in claim 1 wherein the resulting pellets exhibit a uniform shape.

6. A method for forming pellets on an alloy or composite of glass and polymer of increased strength and density comprising the steps of:

a) providing a rod-shaped strand of semi-molten deformable glass and polymer mixture;

b) deforming and cutting the rod-shaped semi-molten strand at a predetermined pelletizing temperature to form uniformly chip-shaped pellets, wherein the pelletizing temperature is that temperature at which the strand is still semi-molten and deformable and at which the so-formed pellets will maintain the shape imparted to them.

7. The method as claimed in claim 6 wherein the semi-molten strand is comprised of a high temperature thermoplastic selected from the group consisting of polyaryletherketones, polyolefins, ABS, polystyrenes, polyphenylene sulfides, polyfluoro resins, polyetherimides, liquid crystal polyesters, polyethersulfones, polyetheretherketones, polyetherketones, polyethylterephthalates, polybutylterephthalates, melamines, polyamides, polycarbonates, and mixtures thereof or of a high temperature thermoset selected from the group consisting of epoxy resins, silicone resins, polyimides, phenolics, diallyl phthalates and mixtures thereof and wherein the pelletizing temperature is at least above about 275° C.

8. The method as claimed in claim 6 wherein the semi-molten strand is comprised a liquid crystal or a polyetheretherketone polymer or mixtures thereof and wherein the pelletizing temperature approximately between 290°–340° C.

9. The method as claimed in claim 6 wherein the pelletizing temperature is that temperature at which the semi-molten strand exhibits a viscosity within the range of about $10^4$–$10^7$ poises ($10^3$–$10^6$ Pa.s).

\* \* \* \* \*

UNITED STATES PATENT AND TRADEMARK OFFICE
CERTIFICATE OF CORRECTION

PATENT NO. : 5,507,990
DATED : April 16, 1996
INVENTOR(S) : Andrea W. BOOKBINDER, Michael FISCHER, Roy J. MONAHAN It is certified that error appears in the above-indentified patent and that said Letters Patent is hereby corrected as shown below:

Column 3, line 32, "1/3 a PEEK"
should read --1/3 PEEK--.

Column 5, line 27, ".892 g/co"
should read --0.892 g/cc--.

Column 6:

Claim 6, line 1, "on an alloy"
should read --of an alloy--.

Signed and Sealed this

Thirteenth Day of August, 1996

Attest:

BRUCE LEHMAN

Attesting Officer      Commissioner of Patents and Trademarks